Figure 1:
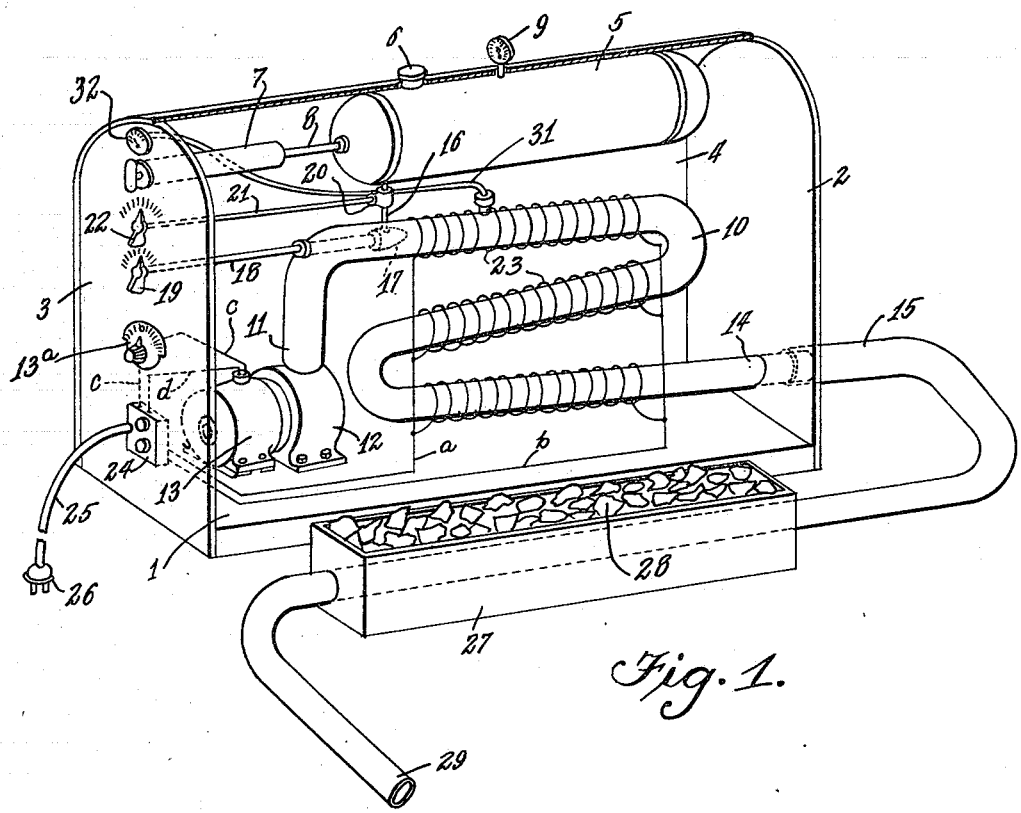

Feb. 9, 1937.  H. H. BATT  2,070,038

METHOD AND MEANS FOR PRODUCING SMOKE AND FOG EFFECTS

Filed Feb. 9, 1935

INVENTOR.
Howard H. Batt
BY Lyon & Lyon
ATTORNEYS

Patented Feb. 9, 1937

2,070,038

UNITED STATES PATENT OFFICE 2,070,038

METHOD AND MEANS FOR PRODUCING SMOKE AND FOG EFFECTS

Howard H. Batt, Los Angeles, Calif.

Application February 9, 1935, Serial No. 5,875

6 Claims. (Cl. 252—1)

My invention relates to method and apparatus for producing smoke and fog effects particularly adapted to the production of smoke screens and smoke and fog effects for stage and cinema purposes.

In the production of smoke effects, such as are commonly employed for the production of smoke screens in army and navy maneuvers, it is the common practice to eject from a suitable device a cloud of smoke consisting essentially of vaporized oil and chemicals which together will produce an opaque vapor.

The characteristic, however, of such vapor and the methods now employed to produce the same are such that the vapors when ejected from the producing device are relatively warm and for this reason rise rapidly, thus detracting from their desired effect which is to maintain the cloud or screen close to the ground or surface over which the vapor is to lie.

When such vapors are to be employed for the production of smoke or fog effects in stage settings or in cinema productions, it is essential that these vapors be maintained close to the floor of the stage or set even though vapors are so disseminated that they are relatively thin and transparent as is required for this purpose. Again the production and dissemination of heated vapors is undesirable since these vapors, particularly when spread thinly, will rapidly rise, removing the vapors from that portion of the stage or setting where the vapor is most desirable. It is necessary, however, to use heat in the production of the vapors in order to produce from a given quantity of liquid oil or chemicals the greatest possible volume of smoke or fog.

It is, therefore, an object of this invention to provide a method for producing smoke and fog effects by vaporizing oil and chemical mixtures of the character now used for this result, and in treating such vapors so produced to cause them to lie close to the floor of the stage or setting, or, in the case of smoke screens, to cause them to lie close to the ground or other surface over which they may be projected.

Another object of the invention is to provide a method of producing relatively great volumes of vapor for smoke and fog effects, in which the vapors so produced will tend to remain at low levels even though thinly distributed.

Another object of the invention is to provide an apparatus for producing such smoke or fog effects in which the vapor may be produced from suitable liquids injected into an air stream, heating the vaporous mixture to assist in the vaporization of the liquids, and then chilling said vaporous mixture to cause them to be heavier, or equal in weight, to the atmosphere into which they are projected.

Figure 2:
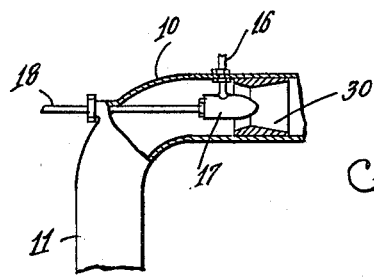

Other objects and advantages will be apparent from a study of the following specification, read in connection with the accompanying drawing, wherein Figure 1 is a perspective view of a machine for producing fog effects, constructed in accordance with my invention; and Figure 2 is a detail view of an atomizer and jet which may be employed in the practice of my invention.

Referring to the drawing, I have illustrated in Fig. 1 a machine for producing fog and smoke effects in accordance with my invention, the embodiment of which is that of a portable machine particularly adapted for the production of fog effects for stage and cinema settings, though it will be understood by those skilled in the art that the apparatus disclosed will be equally well adapted to the production of low hanging smoke screens.

Referring to the drawing, I have illustrated in Fig. 1 a base 1, which may be employed as the bottom of a suitable housing constructed of end plates 2 and 3, to which may be attached side walls 4 (one of which is illustrated as being removed to permit access to the interior of the housing).

Mounted upon one of the side walls 4 may be a suitable tank 5 containing a mixture of oil and chemicals commonly employed in the production of smoke screens used in aviation or used to produce smoke trailers employed by aviators in sky-writing or writing on smoke in the sky. Such materials are usually in the liquid state and may be placed in the tank 5 through a suitable filler opening 6 and pressure built up within the tank 5 by means of a suitable pump 7 connected by means of a pipe 8 to the tank 5. The pressure within the tank may be indicated on a suitable gauge 9 so as to permit the operator of the machine to determine whether or not sufficient pressure has been built up within the tank.

A vaporizer 10 is illustrated as being of a conduit form of a length of relatively large pipe or tubing, one end 11 of which is connected to a fan or blower 12 operated by a suitable motor 13 to create a relatively strong blast of air through the vaporizer 10. The opposite end 14 of the vaporizer 10 extends outwardly through the rear wall 2 of the housing to be connected by any suitable hose, tubing, or pipe 15 constituting an extension of the conduit formed by the vaporizer 10 and extending to the desired point on the set at which the vapor or fog is to be projected thereon.

Interconnecting the tank 5 and the vaporizer 10 is a pipe or nipple 16 which extends into and through the vaporizer 10 to an injector nozzle 17 located within the vaporizer 10. The nozzle 17 is provided with the usual needle valve controlled by a valve rod 18 extending through the front wall 3 of the housing and having a suitable adjusting handle 19 thereon permitting adjustment of the needle valve to any desired position to feed a predetermined quantity of the oil or chemical from the tank 5 into the vaporizer 10. I prefer to provide a cutoff valve 20 in the nipple 16, which valve may be controlled by a suitable rod 21 also extending through the front plate 3 of the housing and provided with a handle 22 thereon permitting suitable adjustment of the valve 20.

As will be understood by those skilled in the art, liquid which is injected from the tank 5 through the nozzle 17 into the blast of air passing through the vaporizer 10 will be picked up by the stream of air and will be vaporized therein, producing a relatively thick cloud of smoke or vapor which will be ejected from the end 14 of the vaporizer 10. However, as will be understood by those skilled in the art, complete vaporization of the oil or other chemicals from the tank 10 will be materially assisted if the air from the blower 12 is heated, or if the vaporizer 10 is heated, and for this purpose I have provided a heating coil 23 surrounding the vaporizer 10 throughout substantially its full length so that the application of electric current to the heater coils 23 will heat the vaporizer pipe and thus assist in the vaporization of the chemical, oil or other liquid used to produce a greater quantity of vapor or smoke therefrom.

While the heat applied to the vaporizer 10 may be supplied thereto in any suitable manner, I prefer to employ the coils 23 as electrical heating coils connected by means of conductors a, b to a switch 24. Current may be supplied to the switch 24 and to the motor 13 by means of a suitable conductor 25 connected to attachment plug 26 insertable in any of the well-known electrical outlet receptacles. The motor 13 may be supplied with current by means of conductors c and d in which may be interposed a rheostat 13a by which the motor and blower speed may be regulated.

The vapors issuing from the outer end 14 of the vaporizer 10 will, by reason of the heating of the vaporizer 10, be relatively warm and thus if these vapors are projected directly on the stage, there will be a tendency for the vapors or fog to rapidly rise from the floor thereof which would spoil the simulation to the natural characteristics of fog. This may be overcome, however, without destroying or spoiling in any manner the vapors or effects of the vapors by passing the smoke or fog from the vaporizer 10 through a suitable cooling agent illustrated herein as a box or tank 27 through which the pipe 15 extends, the tank 27 being packed with ice 28 or in any other manner refrigerated so as to cool off the vaporous mixture of air and fog to such extent that when this fog is passed from the exit end 29 of the pipe 15 it will be so cooled as to be heavier than, or equal in weight to, the surrounding atmosphere into which it is projected and thus cause them to hang close to the floor of the stage or setting over which it is projected. The chilling of such fog may be to any desired temperature above that necessary to condense the vapors back into the liquid state.

It will be apparent to those skilled in the art that the exit end 29 of the pipe 15 may be carried to any desired location or locations on the set, and the vapors distributed upon the set by suitable distributing pipes connected to the exit end 29 of the pipe 15.

While any suitable injector 17 may be employed, I prefer to use a small needle valve nozzle, illustrated particularly in Fig. 2, projecting into a Venturi tube 30 located within the interior of the vaporizer 10, so that the blast of air from the blower 12 will cause a suction at the venturi 30 to assist in rapidly disseminating the liquid from the tank 5 into the air stream.

If desired, the temperature of the vaporizer 10 may be readily and accurately controlled by means of a pyrometer or thermocable 31 projecting into the vaporizer 10 and connected with a suitable dial 32 on the front wall 3 of the housing.

It will be understood by those skilled in the art that the apparatus herein described may be employed with ordinary oil and chemical mixtures for the production of smoke screens in aviation, and may be employed in my system for producing smoke screens for fog effects for stage and cinema productions, in which, while the liquids so used are heated in the vaporizer 10 to produce the greatest quantity of smoke from a given quantity of liquid, the vapors so produced are subsequently chilled prior to their ejection into the atmosphere in which they are to be used. By this method I am enabled to produce a cloud of smoke or fog which will be heavier than the surrounding atmosphere or which will be equal in weight to the surrounding atmosphere for a considerable period of time after the smoke or fog is ejected from the machine. For this reason the vapors so produced may be disseminated evenly throughout an entire setting and will remain in this condition and will remain close to the set for an appreciable period of time, thus permitting the production of fog effects ranging from a heavy, dense fog to a relatively thin fog which may be maintained by regulation of the quantity of vapor produced at any desired value. Further, it will be understood by those skilled in the art that by employing the step of chilling the vapors produced as fog or smoke screen effective, a smoke screen of great density may be provided which will hang close to the ground, ocean or other surface over which the vapors are projected, and which will maintain this position for a relatively great length of time, namely until the surrounding atmosphere has so diluted the vapors or temperature of the surrounding atmosphere has heated the vapors so that they tend to rise.

While I have shown and described the preferred embodiment of my invention, it is to be understood that I do not wish to be limited to any of the details of construction shown herein, except as defined in the appended claims.

I claim:

1. The method of producing smoke or fog effects, which consists in injecting an opaque-vapor producing liquid into an air stream, heating the air to assist the vaporization, and chilling said vaporous mixture so produced to cause it to be as heavy, or heavier than the atmosphere into which it is released.

2. The method of producing smoke or fog effects, which consists in injecting an opaque-vapor producing liquid into an air stream, heating the air to assist in vaporization of said liquid, passing said vaporous mixture so produced through a cooling medium to chill the same to cause it to be as heavy or heavier than the surrounding atmosphere, and then releasing said vaporous mixture to the atmosphere subsequent to said chilling of said vaporous mixture.

3. The method of producing smoke and fog effects which consists in injecting an opaque-vapor producing liquid into an air stream, conducting said air stream through a heating medium to assist in the vaporization of said liquid, and then conducting said air stream through a cooling medium to chill the vaporous mixture so produced to cause it to be as heavy or heavier than the surrounding atmosphere prior to release of said vapors to the atmosphere.

4. In a machine for producing smoke and fog effects, a conduit, means for blowing a stream of air through said conduit toward an exit, means for injecting an opaque-vapor producing liquid into said conduit near one end thereof, means for heating a portion of said conduit spaced from said injecting means in the direction of the flow of air through said conduit, and means for chilling a portion of said conduit spaced from said heated portion thereof in the direction of the flow of the air stream through said conduit.

5. In a machine for producing smoke and fog effects, a conduit, means for blowing a stream of air through said conduit toward an exit, means for injecting an opaque-vapor producing liquid into said conduit near one end thereof, an electric heating element surrounding a portion of said conduit near said injecting means, and means for chilling a portion of said conduit spaced from the heated portion thereof in the direction of the flow of the air stream through said conduit.

6. The method of producing fog or smoke effects which consists in vaporizing a liquid to produce an opaque vaporous mixture with air, heating said liquid during vaporization thereof, chilling said vaporous mixture to cause it to be as heavy or heavier than the surrounding atmosphere, and projecting said vaporous mixture into said atmosphere after being so chilled.

HOWARD H. BATT.